United States Patent [19]

Boyd

[11] Patent Number: 4,499,341

[45] Date of Patent: Feb. 12, 1985

[54] EXTENSIBLE ELECTRICAL CABLE ASSEMBLY

[75] Inventor: James F. Boyd, Greensboro, N.C.

[73] Assignee: AMP Incorporated, Harrisburg, Pa.

[21] Appl. No.: 421,704

[22] Filed: Sep. 22, 1982

[51] Int. Cl.³ .................. H02G 11/02; B65H 75/48
[52] U.S. Cl. .................................. 191/12.4; 242/107
[58] Field of Search .................. 179/155; 191/12.2 R, 191/12.4; 242/107, 84.8; 339/3 R, 3 S, 5 RL, 6 RL, 8 RL, 119 C; 248/330.1, 334.1, 579

[56] References Cited

U.S. PATENT DOCUMENTS

| | | | |
|---|---|---|---|
| 1,277,582 | 9/1918 | Heim | 248/330.1 X |
| 2,578,374 | 12/1951 | Pratt | 248/330.1 |
| 2,751,565 | 6/1956 | Johnston | 191/12.2 R X |
| 3,073,544 | 1/1963 | Cirves et al. | 242/84.8 |
| 3,437,281 | 4/1969 | Quenot | 242/84.8 |
| 3,494,038 | 2/1970 | Quenot | 242/84.8 X |
| 3,657,491 | 4/1972 | Ryder et al. | 191/12.2 R |
| 3,773,987 | 11/1973 | Davis et al. | 191/12.4 |
| 3,821,496 | 6/1974 | Malone | 191/12.2 R |
| 3,959,608 | 5/1976 | Finlayson et al. | 191/12.2 R |
| 4,088,276 | 5/1978 | Littleton | 242/96 X |
| 4,155,168 | 5/1979 | DuBois | 242/84.8 X |
| 4,187,996 | 2/1980 | Ehrlich | 248/330.1 X |
| 4,384,688 | 5/1983 | Smith | 191/12.2 R X |

Primary Examiner—David A. Scherbel
Assistant Examiner—David F. Hubbuch
Attorney, Agent, or Firm—Katherine A. Nelson

[57] ABSTRACT

An extensible electrical cable assembly for use in mechanisms requiring repeated reciprocal movements is disclosed. The assembly is comprised of a static housing and resiliently stressable flat cable, the cable being wrapped in a coil around a hub in the housing. The cable has a first and second ends with electrical connectors thereon, and an intermediate portion, the first end being at the outer end of the coil and the second end being at the inner end of the coil. The cable is extensible upon movement of the first end of the cable away from the housing accompanied by withdrawal of the intermediate portion of the cable from the coil. The cable is in a resiliently lightly stressed condition as a result of its being coiled, the cable being capable of being further resiliently stressed whereby upon movement of the first end of the cable away from the housing, part of the intermediate portion of the cable is withdrawn from the coil, thus reducing the number of layers in the coil and drawing them toward the hub. The diameters of the remaining layers are thereby reduced and resiliently stressed so that they store energy. The energy is released thus causing the cable to be retracted into the housing as the first end of the cable and the housing are moved closer together.

13 Claims, 9 Drawing Figures

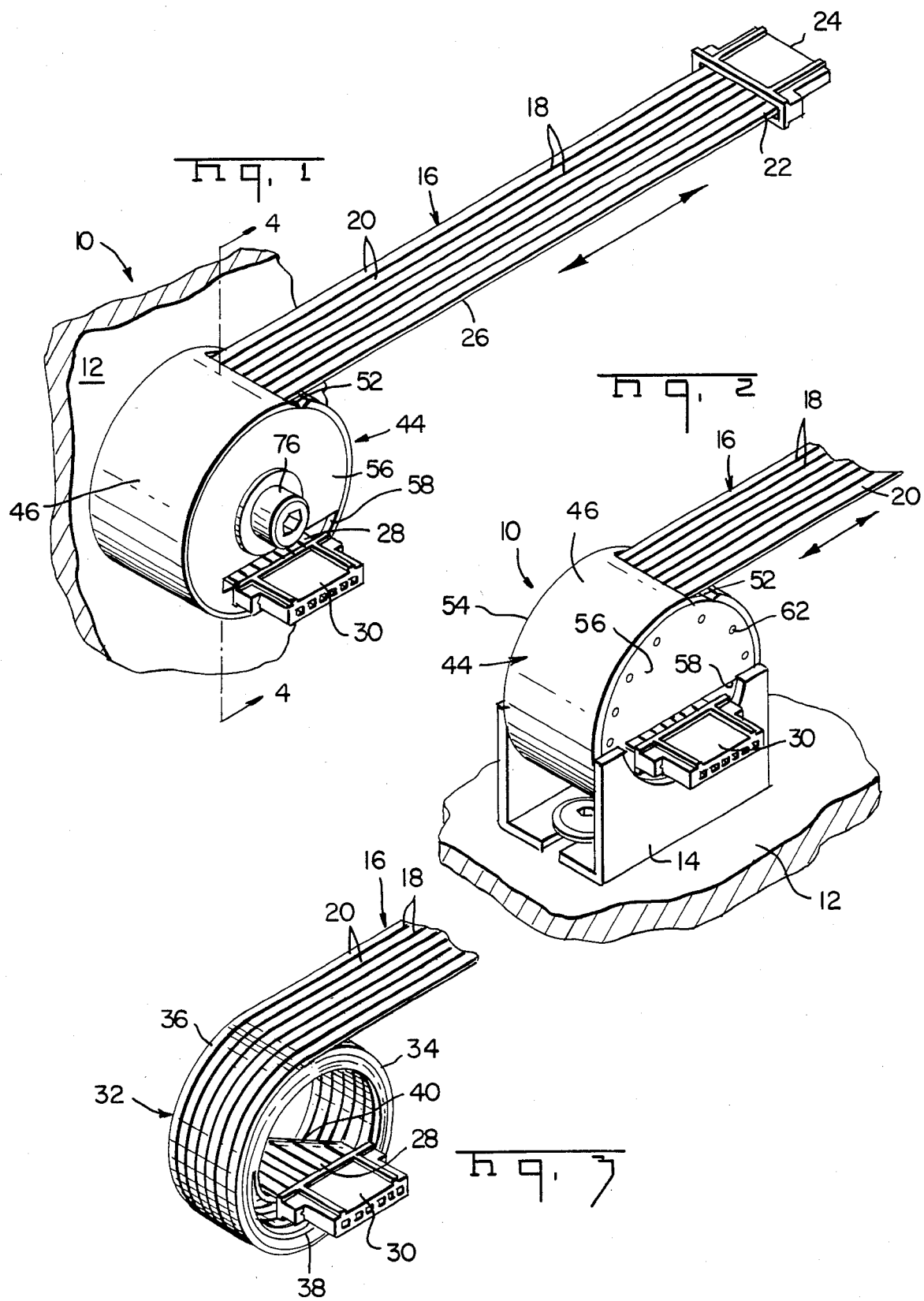

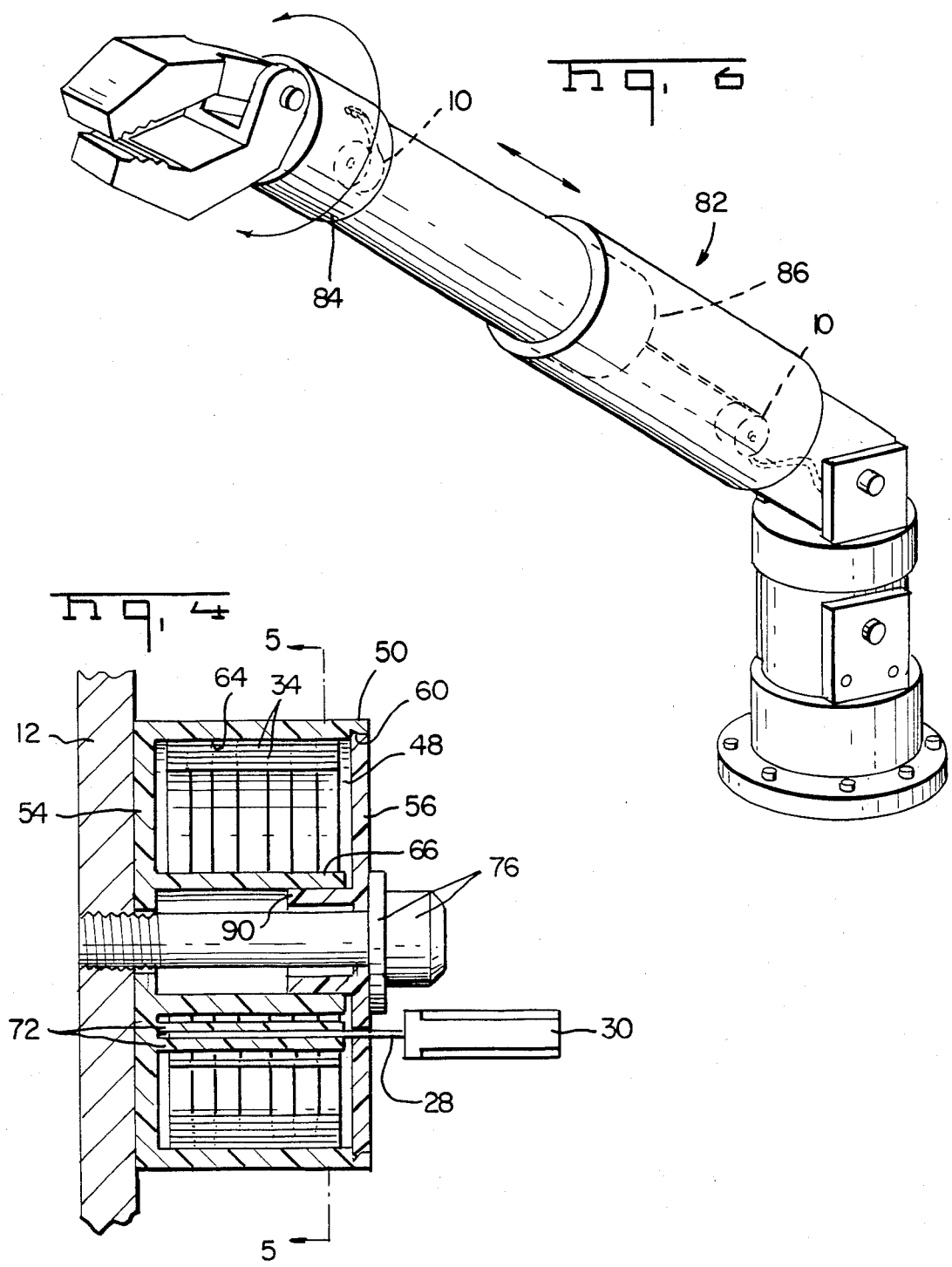

EXTENSIBLE ELECTRICAL CABLE ASSEMBLY

FIELD OF THE INVENTION

This invention relates to extensible electrical cable assemblies of the type used in repetitive reciprocal movement mechanisms.

BACKGROUND OF THE INVENTION

There are numerous applications in today's technology for extensible electrical cable assemblies to provide electrical power to reciprocally moving parts. Some mechanisms that require these assemblies include robots, typewriters, and computer printers.

An essential requirement for these assemblies is that one end of the cable be able to extend and retract smoothly, without interrupting electrical continuity or jamming the mechanism, while the other end of the cable remains substantially stationary. Common devices for producing this capability use revolving reels or housings and spring members which allow the cable to be unwound and rewound. To prevent continual twisting of the cable, these devices further require the use of a sliding contact member between the non-extensible end of the cable and the power source.

The present invention is directed to providing an extensible electrical cable assembly for use with flat flexible cable. The disclosed assembly has a minimum number of parts, a static cable support means, preferably a housing and a coiled length of cable having a connector attached to both ends. The only part of the disclosed assembly that moves is the extensible end of the cable as it extends and retracts. Because there are no moving parts in the support means, the non-extensible end of the cable is essentially held in a fixed position. The need for a sliding contact between it and the power source, therefore, is eliminated.

DESCRIPTION OF THE DRAWINGS

FIG. 1 is a three dimensional view of an extensible electrical cable with the cable extended from the housing and mounted directly on a surface.

FIG. 2 is a view similar to FIG. 1 but showing alternative means for mounting.

FIG. 3 is a three dimensional view of the extensible electrical cable with the housing removed.

FIG. 4 is a cross-sectional side view taken along the line 4—4 of FIG. 1 showing the internal structure of the housing and the mounting means.

FIG. 6 is a diagrammatic three dimensional view illustrating one use of the invention.

FIG. 9 is a three dimensional view of an alternative embodiment.

PREFERRED EMBODIMENT

Figure 5:
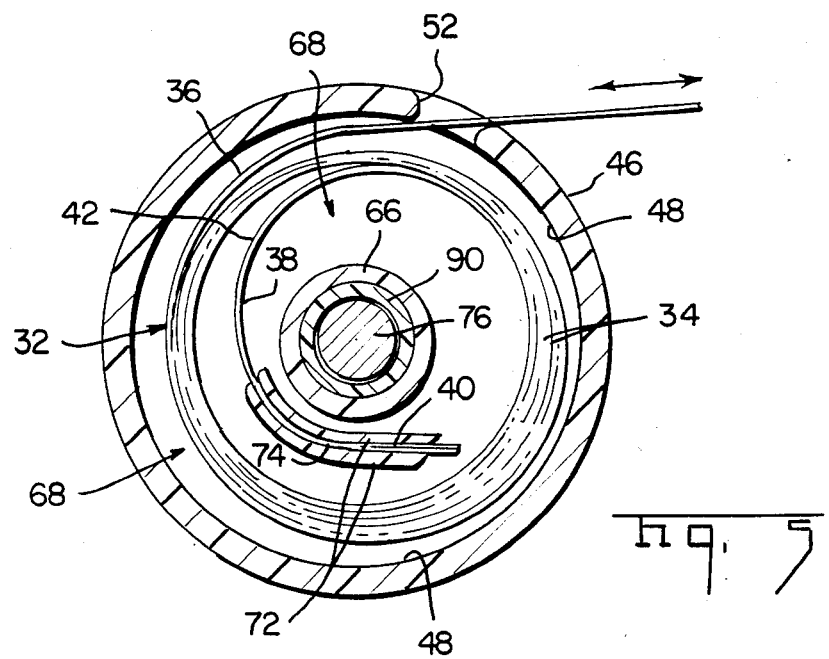
FIG. 5 is a cross-sectional side view taken along the line 5—5 of FIG. 4.

Referring to FIGS. 1 and 2, an extensible electrical cable assembly 10 is intended for direct mounting on a surface 12 or for mounting in a support frame 14 attached to a surface 12. The assembly 10 is comprised of a cable 16 having at least one insulated electrical conductor 18 therein and a housing 44.

Referring to FIGS. 1, 2, and 3, the cable 16 has a first cable end 22 with a first connecting means 24 thereon, an intermediate portion 26, and second cable end 28 with a second connecting means 30 thereon. The cable has at least one insulated electrical conductor 18 surrounded by insulating material 20. As is illustrated in FIG. 3, a cable is formed into a coil 32 inside the housing 44. The coil has a number of layers 34 with the outermost layer 36 containing the first connector end and the innermost layer 38 having a lateral fold 40 therein so that the second cable end 28 extends outwardly from and essentially at right angles to the coil.

Figure 7:
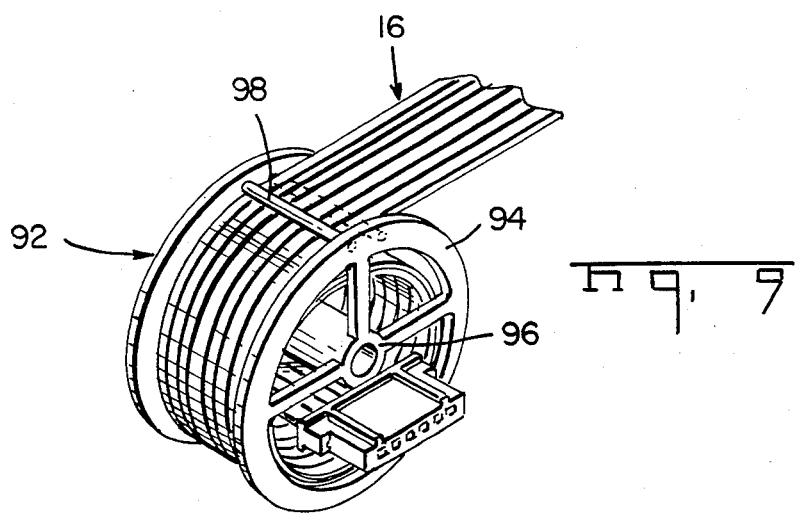
FIG. 7 is a three dimensional exploded view of the housing for the preferred embodiment of the assembly shown in FIG. 1.
Figure 7:
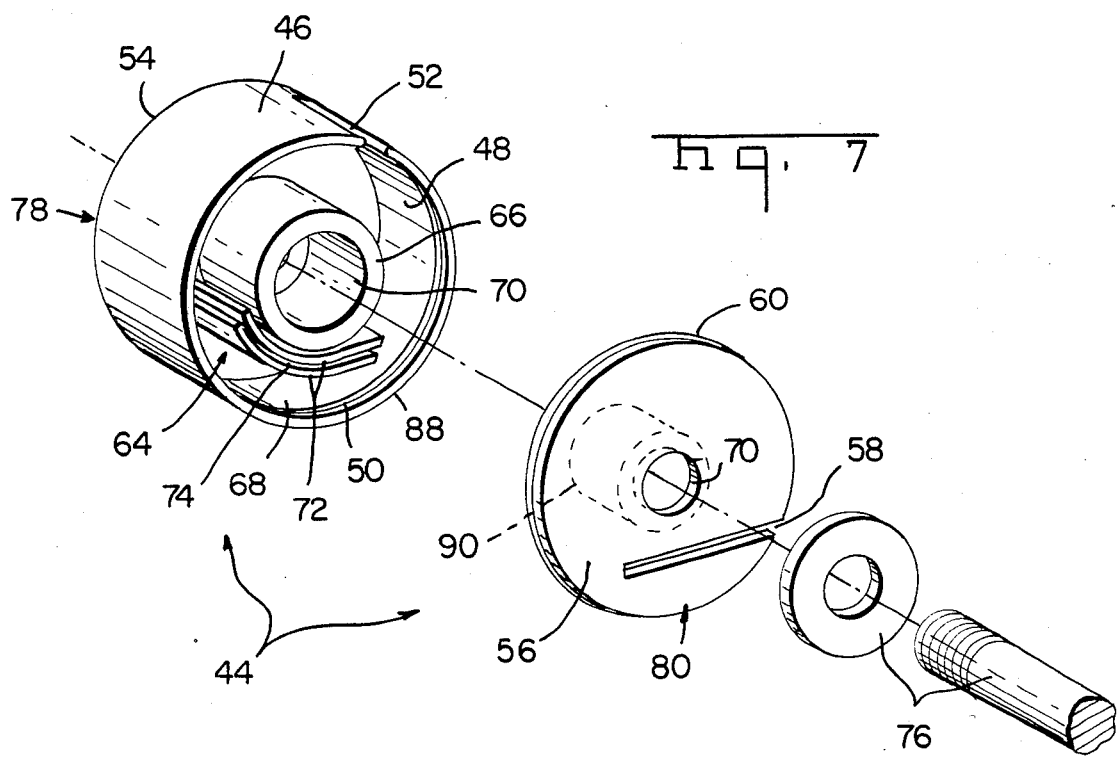

Referring to FIGS. 1, 2 and 7, the housing 44 is comprised of a cylindrical sidewall 46 and first and second endwalls 54, 56 which define a cylindrical cavity 64 therein. The sidewall 46 and the second endwall 56 have openings 52 and 58 into the cylindrical cavity 64. The housing 44 also has a static cylindrical hub 66 extending between the two endwalls 54, 56 and spaced from the internal surface 48 of the sidewall, thus forming a cylindrical chamber 68 for the coil 32 within the housing 44.

Referring now to FIGS. 4, 5 and 7, the housing further has spaced-apart parallel arcuate plates 72 intermediate the hub 66 and internal surface 48 of the sidewall 46, the arcuate plates protecting the lateral fold 40 of the cable. When the coil 32 is inserted into the housing 44, the lateral fold 40 is inserted into the space 74 between the arcuate plates. The innermost layer 38 of the coil extends in a spiral 42 toward the remaining layers 34 of the coil, the outermost layer 36 lying essentially against the internal surface 48 of the sidewall. The first cable end 22 extends through the sidewall opening 52 and the second cable end 28 extends-through the second endwall opening 58 as is illustrated in FIGS. 1 and 2. FIG. 5 further shows that edges of side wall opening 52 are slightly rounded thus providing a smooth path for the cable 16 as it moves into and out of the housing.

Figure 8:
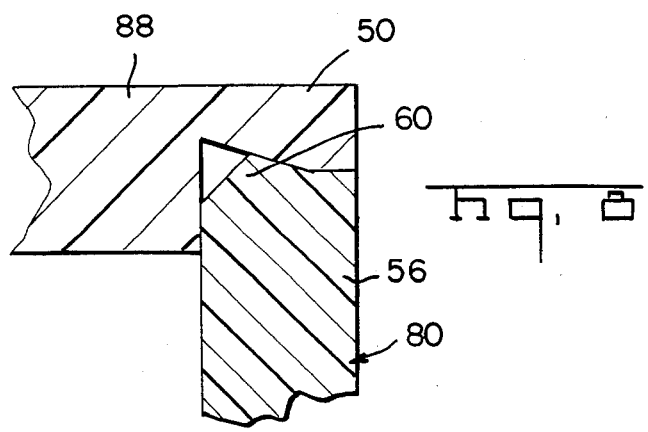
FIG. 8 is an enlarged fragmentary view illustrating the snap-in feature used to join the second endwall to the sidewall.

As is illustrated in FIG. 7, the housing is molded as two separate pieces, the base unit 78 and the cover unit 80. The base unit 78 is comprised of the first endwall 54, the sidewall 46, the hub 66, and the arcuate plates 72, the hub and arcuate plates being integral with the first endwall. In the preferred embodiment the upper edge 88 of the sidewall has cover retaining means 50. The cover unit 80 is comprised of the second endwall 56. The cover unit has a snap-in extension 60, which cooperates with the sidewall retaining means 50, and an interlocking hub portion 90. The snap-in cover feature is shown in FIG. 8. The interlocking hub is shown in FIGS. 4 and 7. These figures also illustrate a passage 70 through the hub 66 for inserting mounting means 76. The cover unit can also be attached to the base unit with glue or other attaching means.

In constructing the assembly, the previously coiled cable 32 as illustrated in FIG. 3 is inserted into the base unit 78, the lateral fold 40 being held by the arcuate plates 72. The second cable end 28 is inserted into the second endwall opening 58 as the cover unit is attached to the housing. Mounting means 76 can then be inserted through the opening 70.

FIG. 9 shows an alternative embodiment 92 of the invention having a cable support means 96, cable confining means 94 and cable retaining means 98.

The disclosed assemblies can be mounted in virtually any position either directly to a surface as shown in FIG. 1, or in a bracket attached to a surface as shown in FIG. 2. The angular direction at which the cable extends can also be controlled by the use of housing positioning means 62 as shown in FIG. 2.

The versatility in the means and direction of mounting the disclosed invention makes it possible to provide an extensible cable for rotational, angular and straight line movement. Rotational movement is particularly desirable in robotics technology. Use of two of the disclosed assemblies in a robot arm 82 is shown in FIG. 6, where one assembly 10 is mounted to provide power to the robot's rotatable wrist 84 and a second assembly 10 is mounted to provide power during the extension of the arm at 86.

The flat ribbon-like cable used in the disclosed invention is comprised of at least one conductor member surrounded by flat ribbon-like insulating material. The cable has a major cross-sectional axis and a minor cross-sectional axis. The length of the major axis varies with respect to the number of conductors in the cable. The length of the minor axis varies with respect to the thickness of the conductor members and the thickness of the insulating material surrounding the conductor members. When the cable is coiled, the major axis extends parallel to the axis of the coil and the minor axis of the cable extends radially with respect to the coil.

The length of the major axis of the cable and the length of the cable itself can vary as the many applications of this assembly vary. It is essential, however, that the cable be in a resiliently lightly stressed condition when it is in its retracted position and capable of being further resiliently stressed. Further, as the cable is extended, there must be sufficient length of cable in the remaining layers of coil to store enough energy to retract the cable into the coil as the extended cable end is moved toward the housing.

The energy is stored in both the conductors and the insulating material. In one example using a cable comprised of 3-mil thick rolled copper conductors with a 2-mil layer of Mylar on both sides, studies indicated that the copper conductors stored 45% of the energy and the insulation 55% of the energy.

The minimum length of cable required to meet these conditions is approximately twice the desired length of extension. Use of the minimum amount of cable, however, shortens the life span of the assembly because of the great amount of stress on the internal layers of the coil as they are drawn toward the hub. It is important not to exceed the elastic limit of the cable material. The stress on the coil can be relieved by using a longer length of cable and increasing the number of layers of cable remaining within the housing when the desired cable extension length has been achieved. A 1½" inside diameter housing can accommodate up to a maximum of 42" of cable before the bulk of the cable prevents retraction of the extended cable.

The length of the cable support means must be at least equal to the length of the major cross-sectional axis of the cable to allow the cable to unwind and rewind freely. Confining means at each end of the support means are necessary to prevent lateral movement of the cable on the cable support means. The height of sidewall retaining means is equal to the distance between the confining means. The length of the opening in the retaining means is substantially equal to the length of the cable's major axis.

By changing the size of the housing and the length of the cable used, the assembly can be used in a wide variety of applications. Where operating space is at a premium, instead of using a cable with a greater major cross-sectional axis, the assemblies may be gang mounted to provide a greater number of conductors.

What is claimed is:

1. An extensible electrical cable assembly of the type comprising a cable having at least one insulated electrical conductor therein, and a support means, the cable being wrapped in a coil around a portion of the support means, the cable having a first end with a first connecting means thereon, an intermediate portion and a second end with a second connecting means thereon, the first end being at the outer end of the coil and the second end being at the inner end of the coil, the cable being extensible upon movement of the first end of the cable away from the support means accompanied by the withdrawal of the intermediate portion of the cable from the coil, the assembly being characterized in that:

the cable is a flat ribbon-like cable comprising at least one conductor insulated by flat ribbon-like insulating material, the cable having a major cross-sectional axis and a minor cross-sectional axis, the cable being coiled with the minor axis of the cable extending radially with respect to the coil and with the major axis extending parallel to the axis of the coil, the support means is comprised of a static cylinder having a width at least equal to the length of the major cross-sectional axis of the cable, said cylinder being said portion of said support means around which the cable is wrapped, confining means to prevent lateral movement of the cable on the cylinder and retaining means to prevent the uncoiling of the cable, the coil having a plurality of layers around the cylinder, the outermost layer having the first cable end and first connector, said first cable end being prevented from uncoiling by the retaining means and the innermost layer of the coil extending in a spiral toward the cylinder, and having a lateral fold in the cable so that the second cable end and second connector extend essentially at a right angle to the coil and extend beyond the confining means, the cable being in a resiliently lightly stressed condition as a result of its being coiled, the cable being capable of being further resiliently stressed whereby, upon movement of the first end of the cable away from the retaining means the intermediate portion of the cable is withdrawn from the coil, the number of layers in the coil is reduced and the remaining layers are drawn closer toward the cylinder accompanied by a reduction in the diameters of the layers, the remaining layers being further resiliently stressed so that they store energy, the energy being released and causing the cable to be retracted onto the cylinder as the first end of the cable and the cylinder are moved closer together.

2. An extensible electrical cable assembly as recited in claim 1 wherein the confining means is comprised of at least one arm extending radially from the cylinder on each side of the coil.

3. An extensible electrical cable assembly as recited in claim 1 wherein the confining means is comprised of circular end walls extending radially from the cylinder on each side of the coil.

4. An extensible electrical cable assembly as recited in claim 2 or 3 wherein the retaining means is comprised of a hollow cylinder having an opening therein surrounding the cylinder and attached to the confining means.

5. An extensible electrical cable as recited in claim 1 wherein the support means is mounted on a surface with mounting means.

6. An extensible electrical cable assembly of the type comprising a cable having therein at least one insulated electrical conductor and a housing, the cable being wrapped in a coil in the housing, the cable having a first end with a first connecting means thereon, an intermediate portion and a second end with a second connecting means thereon, the first end being at the outer end of the coil and the second end being at the inner end of the coil, the cable being extensible upon movement of the first end of the cable away from the housing accompanied by withdrawal of the intermediate portion of the cable from the coil, the assembly being characterized in that:

the cable is a flat, ribbon-like cable comprising at least one conductor insulated by flat insulating material, the cable having a major cross-sectional axis and a minor cross-sectional axis, the cable being coiled with the minor axis of the cable extending radially with respect to the coil and with the major axis extending parallel to the axis of the coil, the housing having a static cylindrical sidewall and first and second static endwalls defining a cylindrical cavity therein, the height of the sidewall being substantially equal to the length of the major cross-sectional axis of the cable, the housing also having a static internal cylindrical hub extending between the two endwalls and spaced from the internal surface of the sidewall thus forming a cylindrical chamber for the cable, the housing sidewall and the second endwall each having an opening into the chamber, the coil having a plurality of layers around the hub, the outermost layer being against the internal surface of the sidewall with the first cable end and first connector extending through the sidewall opening and the innermost layer of the coil extending in a spiral and having a lateral fold in the cable so that the second cable end and second connector extend through the opening in the second endwall, and held adjacent to the second endwall, the fold in the cable lying proximate to the hub, the cable being in a resiliently lightly stressed condition as a result of its being coiled, the cable being capable of being further resiliently stressed whereby, upon movement of the first end of the cable away from the housing, part of the intermediate portion of the cable is withdrawn from the coil, the number of layers in the coil is reduced and the remaining layers are drawn closer toward the hub accompanied by a reduction in the diameters of the layers, the remaining layers being further resiliently stressed so that they store energy, the energy being released and causing the cable to be retracted into the housing as the first end of the cable and the housing are moved closer together.

7. An extensible electrical cable as recited in claim 6 wherein the edges of the sidewall opening are rounded.

8. An extensible electrical cable as recited in claim 6 wherein the opening in the endwall extends across the chamber, proximate to the hub without intersecting the hub for a distance essentially equal to that of the radius of the housing plus the radius of the hub.

9. An extensible electrical cable as recited in claim 6 wherein the housing is further comprised of protecting means for the lateral fold in the cable, the protecting means being integral with one endwall and spaced intermediate the hub and internal surface of the sidewall.

10. An extensible electrical cable as recited in claim 9 wherein the protecting means is comprised of two arcuate plates spaced apart for receiving the lateral fold of the cable.

11. An extensible electrical cable as recited in claim 6 or 9 wherein the housing is mounted on a surface with mounting means.

12. An extensible electrical cable as recited in claim 11 wherein the mounting means comprises a support frame attached to the surface.

13. An extensible electrical cable as recited in claim 11 wherein the hub contains a passage for the insertion of the mounting means.

* * * * *